May 12, 1959

H. C. McKAY 2,886,475

METHOD OF PRODUCING AN ELECTRICAL DEVICE

Filed Feb. 24, 1953

Inventor
Herbert Couchman McKay
By
Attorney

May 12, 1959  H. C. McKAY  2,886,475
METHOD OF PRODUCING AN ELECTRICAL DEVICE
Filed Feb. 24, 1953  6 Sheets-Sheet 2

Inventor
Herbert Couchman McKay
By Warren Dunham Foster
Attorney

May 12, 1959  H. C. McKAY  2,886,475
METHOD OF PRODUCING AN ELECTRICAL DEVICE
Filed Feb. 24, 1953  6 Sheets-Sheet 3

Inventor
Herbert Couchman McKay
By Warren Dunham Foster
Attorney

Inventor
Herbert Couchman McKay
By
Attorney

May 12, 1959     H. C. McKAY     2,886,475
METHOD OF PRODUCING AN ELECTRICAL DEVICE
Filed Feb. 24, 1953     6 Sheets-Sheet 5
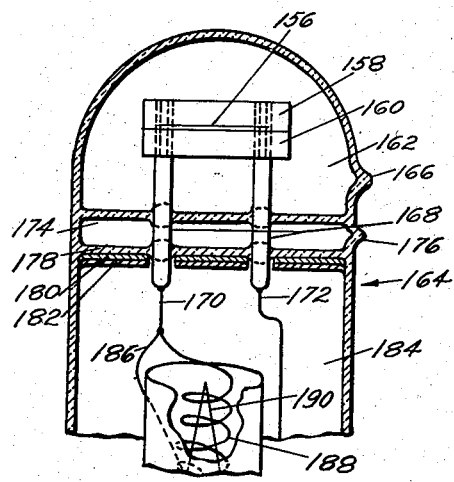
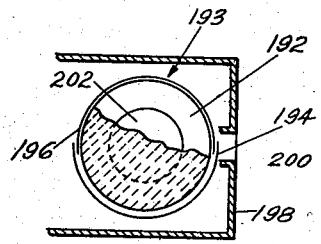
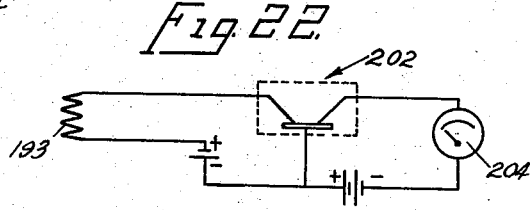
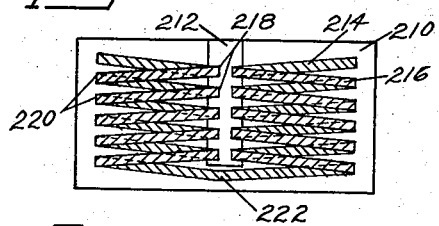
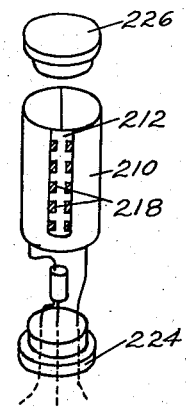
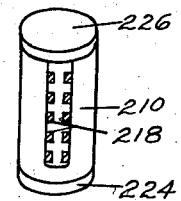
INVENTOR.
HERBERT COUCHMAN McKAY
BY May 12, 1959     H. C. McKAY     2,886,475
METHOD OF PRODUCING AN ELECTRICAL DEVICE
Filed Feb. 24, 1953     6 Sheets-Sheet 6
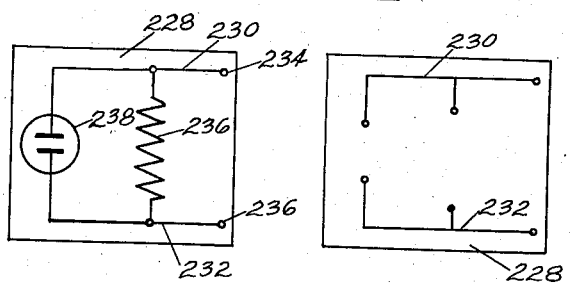
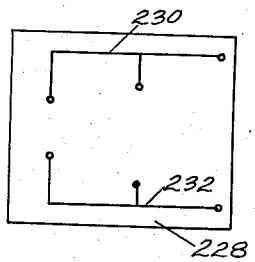
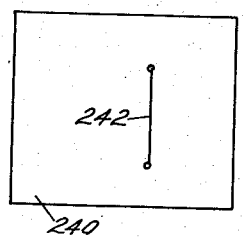
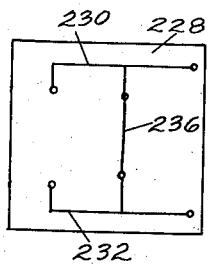
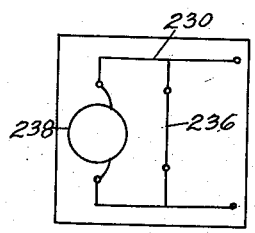
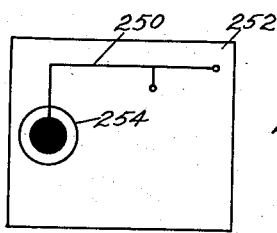
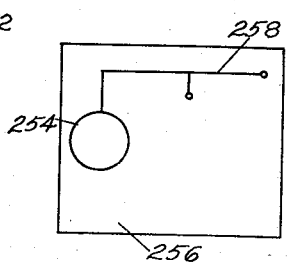
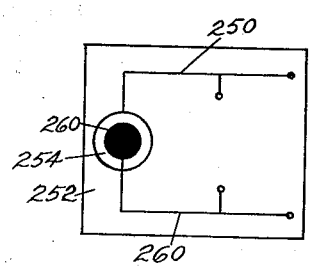
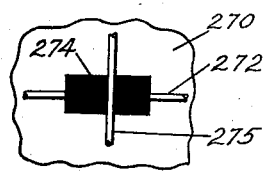
INVENTOR.
HERBERT COUCHMAN McKAY
BY [signature]
Attorney

United States Patent Office 2,886,475
Patented May 12, 1959

2,886,475
METHOD OF PRODUCING AN ELECTRICAL DEVICE

Herbert Couchman McKay, Eustis, Fla., assignor to Warren D. Foster, Ridgewood, N.J., and Herbert C. McKay, Eustis, Fla., as trustees Application February 24, 1953, Serial No. 338,471

The terminal portion of the term of the patent subsequent to February 24, 1953 has been disclaimed 2 Claims. (Cl. 117—212)

Although the printing of electrical circuits has been discussed for many years and much has been done in this field, the results to date have not fully met the hopes of the proponents of this type of production. So far as known, prior to my parent application, true printing technique has not been employed. A primary object of this invention is to do just that. This object includes the production of electrical circuits and devices in a manner more simple, positive, accurate and inexpensive than that previously employed so far as known to me. To this end I form a printing surface, flat or cylindrical, which has protuberances representing the portion of a base upon which I do not wish to imprint an electrical formation. I then "ink" this printing surface with a resist and apply it to a base, thus leaving exposed those portions thereof which represent the wanted electrical formations. I deposit a wanted metal or other electrically useful substance over this entire base, resist-covered and unprotected. The removal of the resist leaves wanted electrical formations in intimate contact with the base. Note is made of my use of printing techniques including direct and close application of both the resist and the wanted metal to a base. Thus I leave intimately affixed to the base a metal which has the electrical characteristics which are desired. Because the pattern of the resist is in immediate contact with the base and its dimensions are held very close I thus maintain the edges of each line or mass of deposited substance within very close tolerances.

In my co-pending parent application, Serial Number 509,530, filed November 8, 1943, and patented February 24, 1953, as Number 2,629,757, I illustrate this principle as applied to the inexpensive making by mass production methods of sensitive thermopiles which are also rugged. A principal object of the present invention is to apply such principles to the printing of other circuits and electrical devices and to present important mechanisms for accomplishing such printing operations applied to thermopiles and to other electrical devices and circuits.

In the past it has been very difficult to produce thermopiles which combine the advantages of cheapness of production and high sensitivity. An object of this invention is to apply to printing by my method of electrical circuits other than thermopiles to secure the same extreme accuracy of dimensions in their various lines, films or masses. This same accuracy and close control simply achieved which give my thermopiles their extreme sensitivity at a low cost are equally advantageous when applied to the printing of other electrical circuits and devices. To achieve such results is one of the objects hereof.

Development of forms of sensitive thermopiles has not kept pace with that of other generally similar electronic impulse receiving devices, as, for example, photoelectric cells, no doubt because of the expense and complication of the production of the critical elements thereof. Since simplicity and economy in the design and manufacture of such instruments is a prime object of this invention, other simplified instruments including but not limited to thermopiles are included within the objects hereof, particularly since such instruments are advantageously made according to the teachings hereof. Another object of this invention therefore includes improved thermopiles and other electrical devices which are adapted to be made by the method and means herein set forth or set forth in my said co-pending parent application or in both thereof or otherwise.

Included within the last above-mentioned object of this invention are simply made thermopiles or other electrical devices each disposed in a single envelope which has two compartments, temperature-insulated from each other, in one of which is positioned a component such as a thermopile which must be protected from heat except that to which it is designed to be responsive and in the other of which is positioned a component which generates heat, such as a first stage of an amplifier.

Another related purpose is the positioning of one element (e.g. a transistor) within the interior of a cylindrical enclosure and the imprinting of a circuit (e.g. that of a thermopile) upon the exterior thereof. I have found it advantageous to print a thermopile or other circuit upon the exterior of a cylindrical body which may be solid or may be a tube within which another electrical device is or may be positioned. In this second instance if the current is that of a thermopile it is necessary to place a tube within a housing which has a window opposite which the hot junctions of a thermopile are disposed. Another phase of this embodiment is the imprinting of an electrical circuit in the pattern of a thermopile upon a flat sheet, or its formation thereon by other means, a central portion of this flat sheet opposite the other junctions being transparent to the radiation to be received, and then forming this sheet as by rolling into a cylinder within which another electrical element, as for example a transistor, is placed. Also any circuit, particularly one to be utilized with an electrical device which must be enclosed within a tube, is printed upon a flat flexible sheet, which is then rolled into a cylinder, with the other device disposed therewithin. Such apparatus and method and means for their production are included within the objects of this invention.

In the past many of the difficulties which have stood in the way of the wide use of ultra-sensitive thermopiles have applied to other circuits and devices. Many metals are difficult to draw in the form of wires as fine as are necessary and to solder them. As with thermocouples the production of many other types of sensitive electrical devices has been limited to small quantities because of the methods of their construction. To avoid the cost and slow rate of production thus imposed in many cases, substitutes less efficient electrically have been utilized. An object of this invention is to overcome such difficulties.

Included within this object is provision of highly minute and uniform elongated filaments of electrically useful elements or accurately dimensioned electrically useful masses. Also included is provision of intimate junctions between relatively small elements, particularly if each has different characteristics, without the use of solder, which introduces into a circuit expensive and difficult techniques and an unwanted amalgam, or without spot welding, which is responsible for other difficulties.

Another object is in a continuous operation to print a long sheet of separate circuits or devices and then cut the finished sheet into individual units, thus saving much time and expense.

In my co-pending parent application I successively apply dissimilar metals to a base. An important object of the present invention is to apply such metals in successive stages as may be required following successive applications for removal of resists. An important modification of this phase is the implantation over one circuit of a dielectric thin sheet which is not soluble in the solvent by which I remove the resist, and thereafter the deposition upon this sheet which represents only a small portion of the total area of another circuit or an element thereof which jumps the original circuit and the use of electrical contact therewith or influence thereupon although the two elements are in close physical juxtaposition. By this method I am able further to simplify production of electrical devices, adapt them to modern production techniques and save production costs.

I shall now briefly describe the methods of my said copending parent application relating to thermopiles because such description makes clear the mechanisms which are claimed herein and the products hereof which are preferably but not always necessarily formed by this method and these mechanisms. I can well illustrate methods by which I produce other electrical circuits and devices by describing my method of producing a thermopile.

It should be stated that a thermopile comprises a plurality of connected thermocouples and a thermocouple is a device which generates an electrical current when its temperature is raised, as by the impingement of infra-red radiation. In a thermopile two series of junctions are formed of wires or bands of electrically dissimilar metals. If one group, known as "hot junctions," is subjected to heat while the other, known as "cold junctions," is maintained at the original temperature, an electrical current will be generated. Thermopiles may be considered to fall into two chief groups, those relatively insensitive and those relatively sensitive.

I may produce a sensitive thermocouple having the above described advantages by first protecting a base which may be, for example, a thin sheet of glass or plastic, with a resist which covers all thereof except minute diagonal parallel lines representing one of the metals which will form the finished thermopile. By "resist" I mean a substance, such as soluble varnish, any material which will receive a metal deposited by vaporization or otherwise, and which when removed from the base will leave the portions of the base underneath the resist free from any deposit of the metal. Such resist, therefore, protects the surface thereunder from the application of the metallic or other substance which is about to be applied to the base. I include substances other than metallic since many such useful for electrical purposes are available. It is to be understood that when I use the word "metal" I include other substances having then-wanted electrical characteristics.

In the type of operation by which I illustrate my invention I then place this base in a vacuum chamber in which a first metal, for example only, silver, is vaporized and then condensed thereupon in my parent patent. Thereupon I clean therefrom the resist first applied, which of course is now covered by the deposited silver, and have a base with minute parallel lines of silver molecularly bonded thereto. I then protect all of this base including all thereof except those minute parallel oppositely diagonal portions upon which I wish to condense a dissimilar metal, for example only, bismuth, and the ends of the lines of silver to which the bismuth lines are to be joined. The result is a base with parallel unprotected lines oppositely inclined to the inclined lines of deposited silver, each impinging upon one end of the first line of metal which has been deposited—in this example silver—and upon the opposite end of the next line in sequence. I thereupon again place the base within the vacuum chamber and vaporize and thereafter condense the other metal, for example bismuth. I may blacken the junctions as described.

Thereupon I remove the resist and have a base with a criss-cross pattern of alternating minute silver and bismuth lines joined at each intersection. As a result of this construction, the individual bands may be kept of almost microscopic size. Moreover, the junctions and the union between each metal and its base are molecular. That is, molecules of the lower surface of the second metal are deposited within the spaces between the molecules of the upper surface of the first metal, and molecules of each metal between those of the glass or other base. Moreover, as the junction is not made at high temperature, there is no danger of loosening a junction by the differential contraction of cooling, nor is the purpose for which the instrument is primarily designed such that temperature changes sufficient to cause such loosening will be encountered. Thus the junction is and remains more intimate than in other construction known to me. As will be readily understood, this method can be carried out quickly and cheaply. In large production, I prefer to apply the several resists by means of rollers and at one time to coat long strips which are later cut into small units.

In the practice of this invention, the several materials may be applied to the bases by hand operations, but I prefer to make use of engraving or printing rollers or cylindrical presses somewhat as in certain photographic operations and in the printing arts. In such instances, the thermopile units may be made in long strips and thereafter cut to size.

Any of the methods described above will produce the essential element of a thermopile which hereinafter for convenience I call a "thermopile unit." Such a unit may be mounted and employed in any conventional or desired way but I much prefer to mount each unit between two sheets of plastic, glass or other substance which is a poor conductor of heat, in such manner that the hot junctions protrude slightly beyond the supporting sheets which cover, protect and insulate the remainder of the unit. The hot junctions are blackened as has been described or treated with lampblack as is conventional in this art so that impinging heat radiation is absorbed and not reflected. The cold junctions are protected by the plastic base and the temperature differential between cold and hot junctions maintained relatively great. The free ends of the thermopile may thereupon be connected with any instrument such, for one example only, as a meter type galvanometer and used in any desired way. The use of this instrument is entirely without the scope of this application. One great advantage of all forms of my invention is that by its practice electric characteristics, notably resistance, of one element of a thermocouple relatively to another or to an instrument in circuit therewith may be maintained as desired with no increase in difficulty or expense of manufacture or loss of sensitivity.

I also may prefer to mount such a unit within an evacuated tube like a radio tube. Also, I may prefer to mount my unit within one chamber in an evacuated tube another chamber of which is insulated from the first and contains the first unit of an amplifying system.

From the foregoing general statement of my parent invention it will be readily understood by those skilled in this art that its novel, cheap and efficient methods illustrated as applied to sensitive thermopiles of improved characteristics may be applied to other devices and circuits.

Objects, advantages and characteristics additional to those stated above and reflected in the above summary of the production of a thermopile will be clear from the subjoined claims. It will be readily understood by those skilled in the art that I am not limited by the specific examples which I show for purposes of illustration but that changes may be made in the specific structure without departing from the spirit of my invention or the scope of my broader claims.

In the drawings:

Figures 1 to 8, both inclusive, show methods of my invention as applied to a thermopile as illustrative of the production of any circuit in accordance with the principles of this invention.

Figures 11, 12:
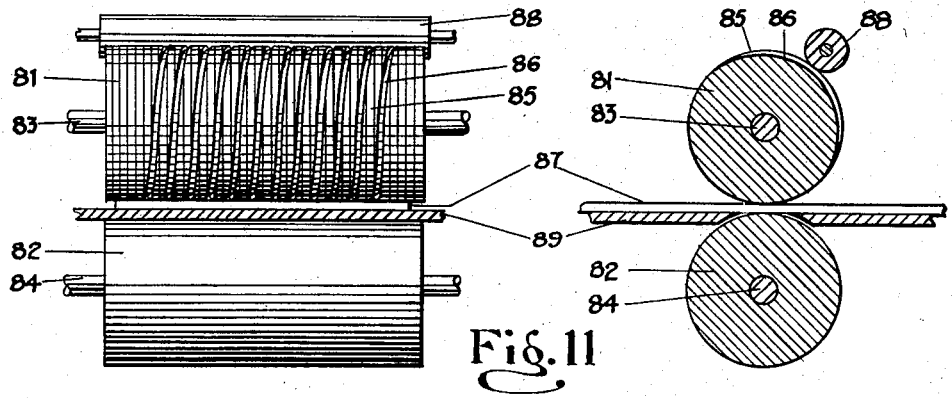

Figure 11 (Sheet 3), which is an elevation partly in section, shows a mechanical device for imprinting a resist, shown for purposes of illustration as for a thermopile.

Figure 12 is a transverse section of the printing device of Figure 11.

Figures 13, 18:
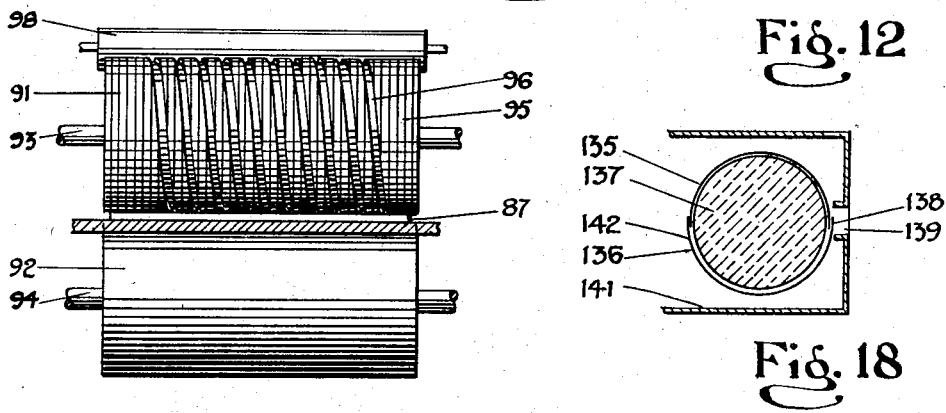

Figure 13 corresponds to Figure 11 but shows a roller for imprinting upon the base the resist precedent to the deposition of a second metal.

Figure 5:
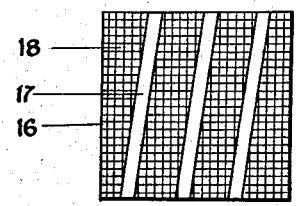
Figure 5 is a top plan view showing a base after the resist for a first metal has been applied.
Figure 7:
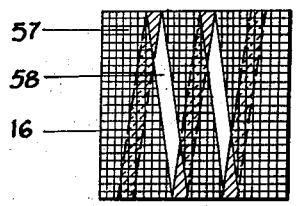
Figure 7 shows the base of Figures 5 and 6 after the resist for a second metal has been applied.
Figure 8:
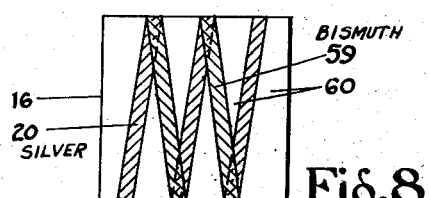
Figure 8 shows a completed base after both metals have been applied and the resist for the second metal also duly removed.
Figure 14:
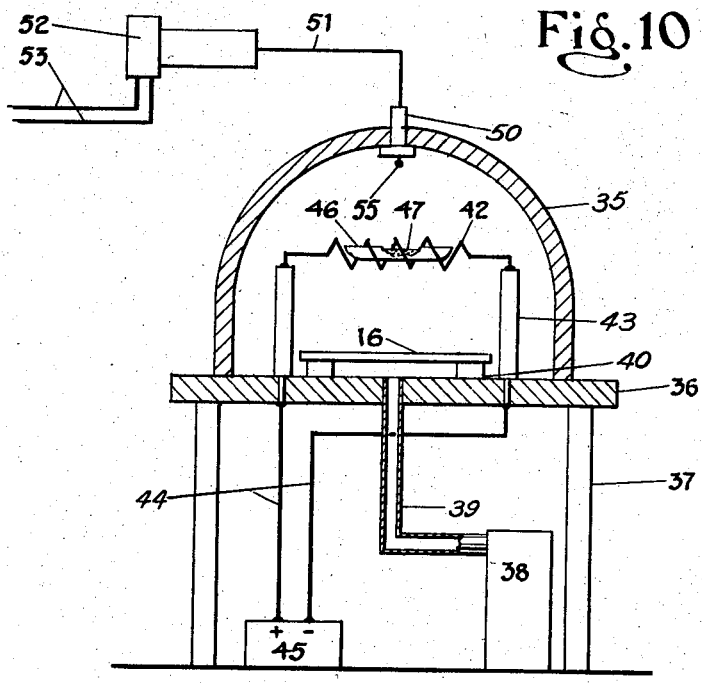

Figure 14 (Sheet 2) shows largely in section an apparatus by means of which a dissimilar metal may be condensed upon bases prepared as indicated above, the condensation of a first metal upon a base such as that of Figure 5 resulting in a semi-finished base such as that of Figure 6, a resist again being applied thereto to produce a pattern such as that of Figure 7 upon which a second metal is condensed to produce a finished base such as that of Figure 8.

Figure 15:
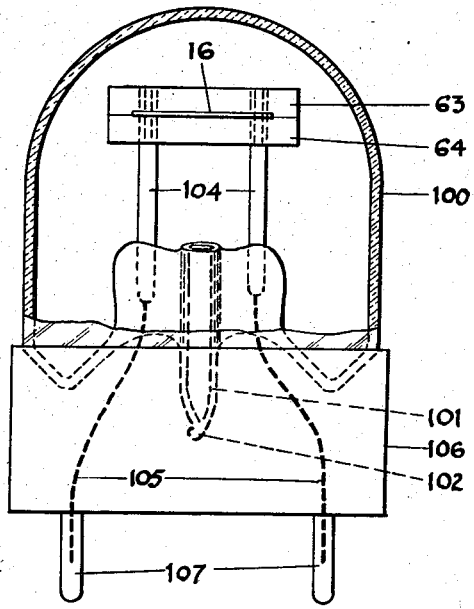

Figure 15 (Sheet 4) is a section of a completed thermopile mounted within an evacuated envelope.

Figure 16:
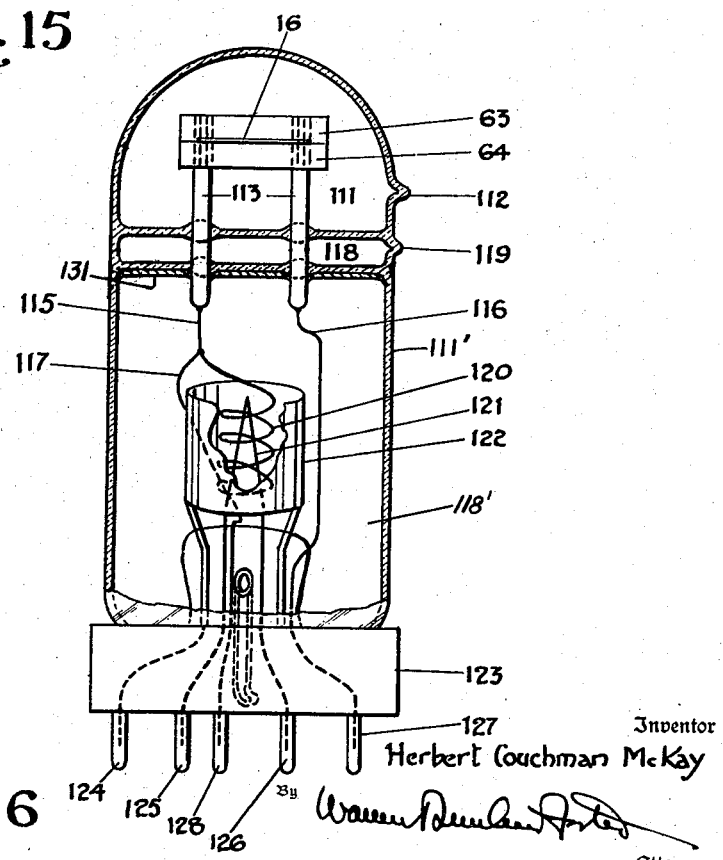

Figure 16 is a section of a completed thermopile and an electronic tube insulated from each other and mounted within the same envelope, the electronic tube for purposes of illustration being shown as a first-stage amplifier.

Figures 17, 19:
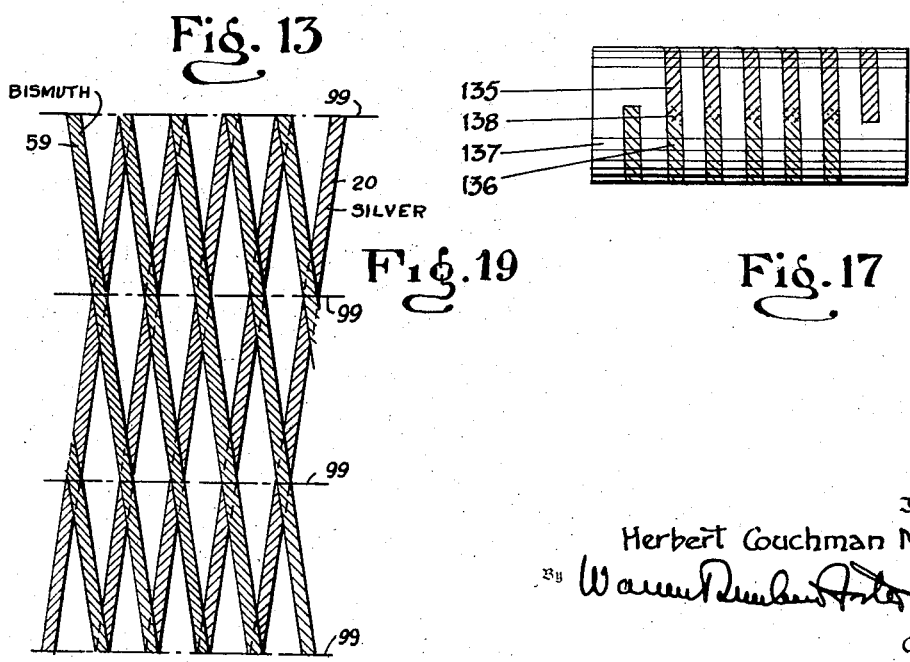

Figure 17 (Sheet 3) is a top elevational view partly in section of a thermopile constructed upon a cylindrical base.

Figure 18 is a sectional view of the thermopile of Figure 17 mounted within a housing.

Figure 19 is an enlarged fragmentary view showing lines upon which a sheet having a thermopile imprinted thereupon is cut in order to produce junctions.

Figure 20 (Sheet 5) is a fragmentary view showing a variant of the structure of Figure 19.

Figure 21 is a transverse section partly broken away corresponding to and showing a variant of the structures of Figures 18 and 19.

Figure 22 is a wiring diagram which is applicable to the structures of Figures 21 to 25, both inclusive.

Figures 23, 24 and 25 show a variant of an electrical device resembling those illustrated by Figures 17, 18 and 21, wherein a circuit shown for purposes of illustration as a thermopile is imprinted upon a flat sheet which is then rolled into cylindrical form with or without another electrical device being placed therewithin.

Figure 23 is a top plan view of such a sheet before it has been rolled into cylindrical form.

Figure 24 is an exploded perspective showing such a sheet after it has been rolled and another electrical element placed therewithin.

Figure 25 corresponds to Figure 24 but shows the device in completed form.

Figures 26–30, both inclusive (Sheet 6), illustrate my method as applied to producing circuits including condensers and in Figures 26 and 30 a product thereof.

Figure 26 illustrates a desired circuit.

Figure 27 is of the first imprint after the previous deposition of a resist, then that of a metallic condenser and thereafter the removal of the resist.

Figure 28 illustrates a second imprint, that of a resistor.

Figure 29 illustrates the combined imprints.

Figure 30 shows an end product with a ceramic condenser added.

Figures 31, 32 and 33 show an alternative arrangement wherein a condenser disk is applied at the condenser location.

Figure 31 shows a first impression with a condenser element.

Figure 32 shows a condenser plate covered with a dielectric.

Figure 33 shows the addition of the second plate and a second circuit leg.

Figure 34 is a fragmentary top elevation showing the "jumping" of one portion of a circuit over another with the previous imposition of a separating dielectric sheet which has been implanted by a printing operation.

All the drawings are largely diagrammatic.

I am about fully to describe the making of a thermopile as illustrative of any electrical circuit. For specific application to other circuits, see the description associated with Figures 26 to 34, both inclusive.

In Figures 1 to 9, both inclusive, and in Figure 19 above described, I illustrate a thermopile in a conventional V pattern. It must be fully understood, however, that I am not limited to such a pattern. As a matter of fact, I may prefer to arrange the films of electrically dissimilar metals in any one of many other convenient patterns.

As pointed out in the preceding portion of this specification, the construction of a sensitive thermopile is based upon "hot junctions" and "cold junctions" of a narrow film or filament of dissimilar metals, as for example, silver and bismuth. In accordance with the practice of this art, I designate the respective junctions as "hot" and "cold." It will be understood that the operation of a thermopile depends upon slight difference in temperature between the two sets of junctions. In a relatively highly sensitive instrument, such as is produced by this invention, these junctions themselves as well as the films should be of relatively small area. According to a preferred form of this invention, I deposit such narrow films of these dissimilar metals upon a base, such as glass, preferably but not necessarily by condensing a metallic vapor to form a pattern. In order to form the necessary pattern, I previously apply a resist to the base. Resists include a soluble varnish such as collodion, gelatine or the like. Some are soluble merely in warm water. They should cover all portions of the base which during that particular operation are to be kept free of the metal. Satisfactory resists also are made with collodion with alcohol and ether, gelatine or glycerine with warm water, and shellac with alcohol. Spar varnish, gold size and asphaltum are also satisfactory. After the deposition of a first selected metal, the resist, together with the metal which is deposited thereupon, is removed by solution and washing and a resist is again applied to cover all portions of the base, including all thereof upon which the first metal has been deposited except the terminal portions of each film which are to form the junctions with a second selected metal, upon which the second metal is not to appear in the finished thermopile.

Figure 1:
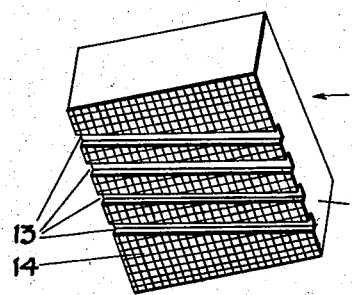
Figure 1 is an isometric showing of a stamp by which a resist may be applied precedent to the application of a first metal to a base.
Figure 2:
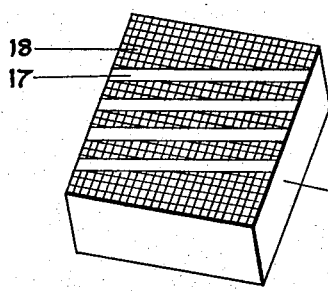
Figure 2 is an isometric showing of a base to which a resist for a first metal has been applied as by a stamp of the type of Figure 1.

A simple stamp 11 for applying a resist is shown in Figure 1. In a block 12, which may be of rubber, wood, metal or any other satisfactory material, grooves 13 are cut. This operation leaves between the grooves and between them and the outer edges of the block raised portions 14. The result is in effect a stamp or type suitable for printing, even by hand but preferably in a press. A resist is then placed upon the raised surface 14 and the stamp is impressed upon a chemically clean sheet of glass or other base 16 as shown in Figure 2. After the stamp has been removed from the base, the result of the impression, likewise as shown in Figures 2 and 5, is a pattern with clear portions 17 which are separated by protected portions 18. From the foregoing portion of this specification, it should be understood that when a metal is deposited upon such a base the entire surface is covered with that metal but within areas 18 the base itself will be protected by the resist; and, as the resist and metal deposited thereupon are removed, a pattern such as that shown by Figure 6 will appear in which bands or striations 20 of the metal are separated by clear portions 21. This base and the sheet from which it is cut must be electrically non-conducting and such terms when used in the sub-joined claims should be so understood.

Figure 3:
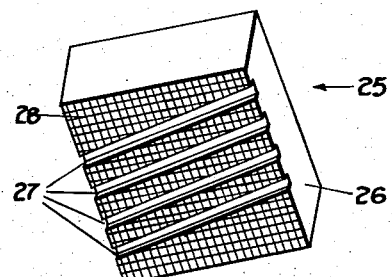
Figure 3 is an isometric showing of a stamp for the application of a resist precedent to the deposition of a second metal.
Figure 4:
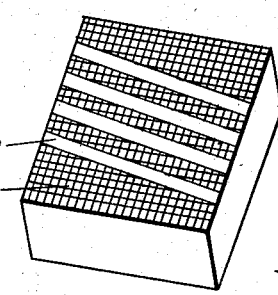
Figure 4 is an isometric showing of a base to which a resist for a second metal has been applied as by a stamp of Figure 3.

In order to deposit a second and dissimilar metal in the desired pattern, it is necessary to complete the V-shaped pattern by an additional application of a resist. A convenient instrumentality for this purpose is a stamp or type 25 formed as shown in Figure 3. This device also consists of a block 26 into which grooves 27 have been cut, leaving raised portions 28. The impression of such a block after a resist has been applied to the raised portions 28 is shown in Figure 4. The clear pattern 30 separated by protected portions 31 is similar to that of Figures 2 and 5 but the elements of the pattern are those of the other legs of the ultimate V pattern shown by Figure 7.

As stated hereinbefore, the drawings are very largely diagrammatic. For example, in the drawings described above and below for simplicity I have shown only four films of each metal, although as a matter of fact I prefer many more.

For purposes of illustration I show the deposition of metal by means of vaporization and condensation. Alternatively, however, other methods of deposition may be employed but in every instance with the application of the metal over a resist pattern. Sputtering in a vacuum may be used although in this case I lose some of the extreme accuracy of line which I obtain by condensation. Alternatively I roll or press a metallic foil upon a resist pattern which is covered with an adhesive. The portions of the foil which adhere to the resist come away with the resist leaving the pattern adhering to the base. In more simple forms, brushing, flowing or spraying a conductive lacquer over a resist pattern may be employed since the unwanted lacquer will disappear from the base with the resist. In all methods of depositing the metal, however, it must be understood that I first apply a resist directly to a base by means of printing or stamping and then deposit the metal and thereafter remove the unwanted metal and the resist together. It is, therefore, to be understood that there is no space between the resist and the base and the metal itself adheres directly to the base. I avoid the use of a stencil with which I have found it impossible to secure closely accurate demarcation between conducting metal of a circuit or other electrical device and the non-conducting base.

For purposes of illustration I shall now show how I may make use of condensation.

As shown in Figure 14, a base 16 prepared as shown in Figure 5, is placed within a vessel or bell 35. This vessel may be mounted upon a base or table 36 supported as by struts or a housing 37. To evacuate this vessel, a conventional motor-driven air pump 38 is connected thereto by a tube 39. Within the vessel, supports 40 are arranged, upon which bases 16 may successively rest. Vaporization of a selected metal is accomplished by means of a coil 42 supported by struts 43 placed acentrically within the interior of the vessel. This coil is fed by leads 44 from source of electrical energy 45, generally of low voltage. A vessel 46 of the type known in this art as a "boat" containing a metal 47, such for example only as silver or bismuth, is disposed within the coil and surrounded thereby.

Energization of the coil to the point of incandescence will, of course, volatilize the metal in a manner which is conventional in the art of metallic vapor deposition. The vaporized metal diffuses throughout the interior of the bell. Thereupon the current is cut off. It is thereafter necessary to carry out the process known in this art as "cleaning," the precipitation or condensation of the metal. It is preferable that within the chamber a high tension current be discharged by a device generally indicated as 50 which is connected by lead 51 to a high-tension coil 52 of the Tesla or Ouidin type which is fed from a usual transformer by a circuit 53. This high-tension current is discharged by a ball 55 within the chamber 35 and causes vaporized metal to be deposited within the chamber. It thereafter presents a highly polished surface.

The vacuum within the chamber should be relatively high, preferably of the order of a fraction of a micron, for example 0.0005 to 0.001 mm. mercury. During the evacuation and prior to the vaporization and deposition of the metal as described above, the preliminary discharge from the high-tension coil through the ball 55 by its specific appearance serves as a visual indication of the approximate degree of evacuation within the chamber.

Figure 6:
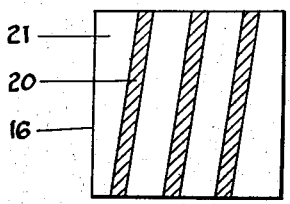
Figure 6 shows the base of Figure 5 after a first metal has been deposited and the resist removed.

After the first metal, say silver for example only, has been so deposited as a thin and narrow metallic film 20 upon a base 16, the resist is cleaned off, leaving the base in the form shown in Figure 6. Other portions of the base to receive the condensed metal must be chemically clean. Thereupon a resist is again applied as by the stamp of Figure 3 to cover all the base except those portions upon which a film of the opposite metal, say bismuth for purposes of example only, is to be deposited. This resist takes the form 57 shown in Figure 7. Striations 58 remain clear ready for the deposition of the bismuth or other metal. Thereupon the base 16 is again placed within chamber 35, bismuth substituted for silver in the boat 46, a vacuum created and the previous process of vaporizing and deposition is thereupon repeated with the result shown in Figure 8. At this point, there results a base 16 with alternate striations 20 and 59 of silver and bismuth, the remaining portions 60 of the base being clear. These V-shaped films form the hot and cold junctions respectively of the finished thermopile.

If desired the metals which adhere to the resist may be recovered and used again. Often, however, the quantities involved, considering the little depth of the deposited mass, are too small to make recovery economic, unless production is very large.

It is particularly to be noted that the junctions which are thus created are extremely intimate and, in fact, are the result of a molecular physical union between the glass or other base and the two metals. The thickness of each film is of the order of from two to three microns, say one ten-thousandths of an inch. In order to secure balanced electrical resistance, it is desirable, for example, to make use of approximately four times the volume of bismuth as of silver. According to this and all other forms of this invention, such differences can be accurately and easily secured. In practice I have found it advisable to make each film approximately one-quarter of a millimeter in width and to space them from one to two millimeters apart. Thus each film is of a width approximately 2500 times its thickness and is a true and very thin foil. As a result, very much increased sensitivity is secured. Although metallic films of relatively large surface area have previously been made of this extreme thinness, so far as I am aware such films which are both thin and narrow for the express purpose of providing an electrical conductor of as much surface exposure as possible with a minimum of mass are novel. If, however, less sensitivity is desired, each film may be made wider and thicker. It is to be understood, however, that these dimensions are given for purposes of illustration only and that I am in no way committing myself to films of any given thickness or width. I emphasize that according to my method it is easily possible to produce hot and cold junctions in which the bond is very much more intimate than any that has been previously achieved, so far as I am aware, and in which the thickness of the metal and the amount included within the junctions are also very much less than in the conventional sensitive thermocouple.

One of the great advantages of this embodiment of my invention is the exact quantitative control which can be obtained. Since the surface area of each film is held by the pattern of the resist within very close limits, the mass of each metal is determined solely by the amount thereof which is condensed upon the base. This condensation can be controlled within the very closest bounds, with the thickness of each metal held within a micron or less. My ability under this method closely to control the thickness of each filament, as well as its width, is of almost great advantage when printing filaments other than those of a thermopile.

As is well known in this art, the resistances of the two metals must be carefully adjusted to each other. This adjustment is best carried out by differences in mass which are most easily and accurately secured by differences in thickness. For example, in the silver and bismuth combination, which is mentioned solely for purposes of illustration, it is desirable to provide approximately four times the mass of bismuth as of silver. This result is most easily obtained by depositing a bismuth layer which is four times as thick as that of silver. Alternatively, the film of one metal may be made of greater width than that of the other, but this method does not give me as close control and presents greater manufacturing difficulty.

I wish again to emphasize the fact that the specific metals which I mention herein are for purposes of illustration only and that I am in no way limited to those metals or combinations. Silver, for example, has been found very effective for ordinary conductive leads, irrespective of its behavior under temperature changes. Its cost, particularly when small quantities are involved, is not much greater than that of copper, when its greater efficiency is considered.

As is known to those skilled in the art, the hot junctions must be blackened in order to make them as absorptive as possible of impinging infra-red rays. A conventional method is to apply lamp-black or the like. Alternatively, a third condensing operation may be performed in which zinc or an alloy of zinc, preferably zinc-antimony, is placed within the boat 46 and the condensing operation carried out as previously described. The result is a molecularly bonded black absorptive coating covering the entire structure.

In a thermopile I much prefer, however, to accomplish this blackening result without the use of a separate step. To this end, I proceed as previously described except that in the deposition of a second metal I increase pressure within the bell jar to an amount sufficient to cause the blackening of the particular metal employed, for example as much as .25 mm. mercury, in the case of bismuth. The result is a deposit of the second metal and the blackening of the junctions in the one operation, thus eliminating a troublesome separate step.

In any form of my invention I am not limited to any number of applications of circuits. The number can be indefinitely increased over the two utilized for the thermopile.

As previously explained I am describing this method of making a thermopile as the basis for subsequent description of mechanism by which the resist may be implanted and is illustrative of how other types of circuits may be employed, or how other types of circuits and devices may be printed by closely similar means. Before discussing such applications of my invention and other method and means for printing I shall now describe preferred mountings for my thermopiles and for other electrical devices as indicated.

Figure 9:
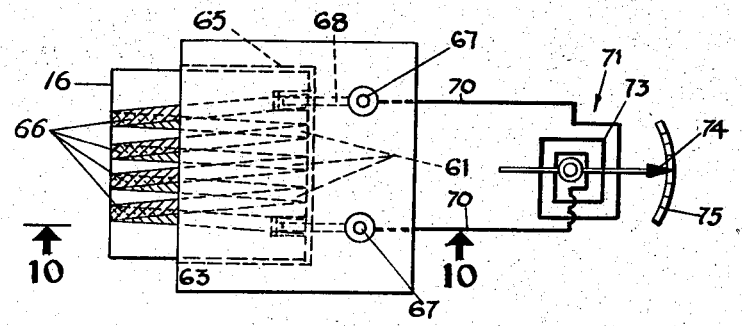
Figure 9 (Sheet 2) is a top plan view which shows one type of my completed thermopile.
Figure 10:
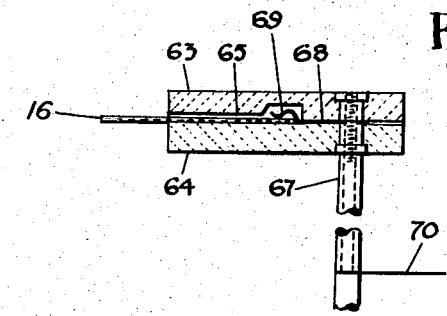
Figure 10 is a partial section on the line 10—10 of Figure 9 looking in the direction of the arrows.

A preferred mounting for my thermocouple unit is illustrated in Figures 9 and 10. The greater the difference in temperature between the cold junctions and the hot junctions, the greater the electrical flow which is induced therebetween. In order well to insulate cold junctions 61, I may mount unit 16 between two plates of plastic 63 and 64 or of other material which is opaque to infra-red radiation. In one of these plates I cut an opening 65 which receives the base. The sides of these plates extend beyond three of the edges of the thermocouple and consequently give it rigidity. Alternatively, I may cast a single block of plastic with appropriate openings. A portion of the unit, however, sufficiently wide to accommodate the hot junctions 66, is permitted to extend outwardly from the mass of the plastic plates 63 and 64. These hot junctions are thus exposed to an incoming signal, while the cold junctions are well insulated therefrom. I may coat the exposed hot junctions with an absorptive material, such as lamp-black or platinum black, as is common with sensitive thermocouples. I prefer to apply such coatings in all forms of my thermopiles. Or, I may blacken by the vaporization method previously described. I prefer to mount the entire cell and structure upon posts 67 to which ends of the filament are attached as by leads 68, which may terminate in a light contact spring 69.

The minute current which is created by the impact of infra-red radiation upon the hot junctions 66 can be utilized in any desired or appropriate fashion. In Figure 9, I show it connected by leads 70 to a conventional galvanometer indicated as 71 in which a coil 73 operates a pointer 74 with which is associated a scale 75.

I may prefer to use a sensitive relay of the meter type which closes a circuit to a power relay which operates whatever apparatus a user may desire to control. Alternatively, by leads 68 an input grid of an amplifier tube may be fed. Preferred mountings for this unit are shown in Figures 15 and 16 (Sheet 4) and another preferred form of unit in Figures 17 and 18 (Sheet 3), all later described. It is to be understood that the work to be performed by the current created by this thermopile does not fall within the ambit of this invention.

In the preceding portion of this specification, I have described a simple method, together with means for carrying it out, of implanting a resist upon a base. Figures 11 and 12 illustrate other and preferred and more highly developed methods and means for implanting a resist upon a base.

Two rollers 81 and 82 respectively may be driven in any conventional or desired manner. Upper roller 81 may have cut upon it a pattern similar to that of stamp 11 of Figure 1, raised portions 85 appearing between grooves 86. Roller 82 is a plain cooperating pressure roller. The resist is applied by "inking" rollers 88 such as those usual in the printing art. It will be understood that any desired and practicable pattern may be substituted for that just described.

In this case, base material 87 is supplied in relatively long sheets or rolls which are later cut into individual units. The base may be of glass or of any desired plastic, such for example as cellulose acetate. It is fed forwardly upon bed 89. In this instance, after the unit has been so applied, relatively much longer lengths are placed within a vacuum chamber and a first metal deposited and the resist and surplus metal cleaned off. Thereupon to this sheet, which now corresponds to that shown in Figure 6, the resist is again applied by rollers 91 and 92 shown by Figure 13. Roller 91 has raised portions 95 which correspond to raised portions 85 of roller 81 and grooves 96 which correspond to grooves 86 but disposed in an opposite direction. Cooperating roller 92 is plain. These rollers revolve upon shafts 95 and 94 respectively. The resist is applied by a roller 98. The result of this operation is a strip of base material corresponding to that shown by Figure 7. After a second metal has been deposited thereupon, the results are similar to those shown by Figure 8. Thereupon the sheets are cut through the hot junctions and cold junctions, with additional longitudinal cuts if desired, to form individual thermopile bases or units. From the previous portion of this description in consideration of such figures as 8 and 9 hereof it will be evident that these junctions have appreciable area and as shown for purposes of illustration only take the form of a letter X. As is clearly shown in Figure 19 since they are cut, along the line indicated as 99, at the point at which two films making up the X cross, the severance of each X form leaves two dissimilar metals in intimate union in the form of two letters V. Thus by cutting my strip or base material straight across these original junctions I form two junctions which are completely operative.

In the above description, I have illustrated the rollers 82 and 92 as smooth surfaced and employed solely to exert pressure. In those instances in which I wish to imprint a circuit upon each side of a base I form these rollers of any desired or necessary pattern.

From the above discussion it will be evident how electrical circuits or devices other than thermopiles can be printed in a similar manner, either complete in themselves for one resist-deposition-cleaning operation or successively. For illustration see Figures 26 to 34 hereinafter described.

As previously stated, each unit may be mounted in any desired manner. One preferred form, already described, is shown by Figures 9 and 10. As is shown in Figure 15, I may mount such a unit 16, held between plastic plates 63 and 64 as shown in Figure 10, within an envelope 100 of a substance transparent to infra-red radiation which has been evacuated by a tube 101 sealed off at 102. Pillars 104 both support these plates (corresponding to pillars 67 of Figures 9 and 10) and serve as a conducting medium for the two wires 105 which pass through a base 106 and terminate in contact prongs 107. It is to be noted that the construction of such a tube with a thermopile is as simple and inexpensive as that of many types of radio tubes.

For purposes of convenience and greater efficiency in manufacture and use, it is often desirable to mount my thermopile unit in an evacuated vessel or envelope which likewise carries an electronic tube which may well be the first element of an amplifier circuit.

A cell unit 16 supported by mounting plates 63 and 64 may be positioned in a chamber 111 within an envelope 111′ which has been exhausted through an opening sealed at 112. Mounting posts 113 support the thermopile and house the upper portion, as viewed in the drawings, of leads 115 and 116 which proceed from the thermopile. Lead 116 is biased at 117. These posts pass through an evacuated chamber 118 which has been exhausted and sealed as at 119. A third and lower evacuated chamber 118′ is in effect an electronic tube. It has a grid 120 which is activated by lead 115 from the thermopile, a filament 121 and a plate 122. Five leads pass through a base 123 into their respective base pins, 124 for the palte, 125 and 126 for the filament, 127 for lead 116 which is the ground potential negative, and 128 for the grid bias lead 117.

Since the elements in the lower chamber 118′ generate heat from which the thermopile 16 must be protected I introduce insulating media therebetween. These include the vacuum of the chamber 118 which is effective against conducted but not radiant heat. As is well known in this art a getter is flashed in almost all electronic tubes. This getter leaves a silvery and reflecting deposit effective upon the rays which carry radiant heat upon the interior surfaces of the walls of the chamber. As a matter of my own actual practice I have found that this getter is sufficient to reflect back, in this instance away from the thermopile, the heat which is radiated from below, as seen in Figure 16. I have learned, however, that in some tubes the interior of this top wall is not completely covered by a getter. Therefore I add a layer of silver or other reflective metal 131 upon this under surface. Alternatively, the getter may be so flashed that it covers the upper transverse partition of the lower chamber. Thus I obtain certainty of reflection as a protection for the thermopile 16 against radiated heat and protection against conducted heat by the vacuum in the chamber 118. It is desirable to stop this reflective coating a very short distance away from the pillars 113 and it may be desirable to carry this coating down the interior of the vertical walls of this chamber. Other components of an electronic instrument having similar requirements and characteristics as to heat may be similarly housed. For an alternative construction see Figure 20 and the description thereof.

It will be recognized by those skilled in this art that the above construction represents a convenient, novel and efficient electronic device which combines within one envelope two cooperating electronic devices, one heat-producing and the other which must be protected against heat. This construction minimizes loss and gives a short grid lead as required by devices activated by minute currents. Although such an arrangement embodying the first element of an amplifier circuit is particularly useful, I may combine other elements within the same envelope which houses my thermopile. In such instance a short extension of an output lead feeds a grid of the cooperating electronic device. In the past a plurality of elements have been positioned within the same envelope; but, so far as known to me, it is novel to position within one outside enclosure a plurality of elements which require different conditions of ambient temperature and to separate such elements by a double partition enclosing a vacuum and by a reflector of radiant heat. The utility of such an arrangement is great. The sensitive circuit is protected from external electrical disturbances, such for example as capacitative changes; trouble from corresponding and loosening connections is eliminated. In addition the stable or cold junctions must be protected from the heat generated by the thermionic elements of the tube. A single glass wall is not sufficient, but a reflector of radiant heat and a double wall enclosing a vacuum are very effective. This phase of my invention is not limited to thermopiles but can well be applied to any electronic instruments having similar characteristics and requirements.

According to the above construction, since there is no need for any circuit building between the two significant parts, the cell can be permanently welded into position, thus providing current continuity and rigid support for the cell and making possible the pre-positioning of the cell so that interchange of one cell for another within sensitive apparatus may be effected without the necessity for prolonged and delicate positioning. Such pre-positioning applies also to the other arrangements which I am illustrating herein.

A novel housing and mounting for a thermopile or other electrical device as shown in Figures 17 and 18, similar in some aspects to those of Figures 21, 23, 24 and 25, may be used alternatively to those previously described.

Bands 135 and 136 of dissimilar metals are deposited upon a cylindrical support 137, forming hot junctions 138. Such hot junctions in such a cylinder may be disposed before a window or opening 139 in a casing 141 while the cold junctions 142 are disposed upon opposite sides of the cylinder and hence protected.

Alternatively to the thermopile shown in these figures any other electrical circuit or device can be so supported, whether or not it is originally implanted by the means and mechanism hereof.

A convenient method of implanting the two resists successively required for a thermopile is to roll the cylinder 137 upon its own axis along a flat type plate, so to speak, which represents the pattern of a wanted resist. Alternatively, relative movement is reversed, the cylinder 137 placed upon a fixed axis of revolution and a flat image-impressing surface rolled over the cylinder or preferably between two such cylinders, pattern-images being situated upon each side of the plate. Method and mechanism for so implanting pattern representing an electrical circuit will be clear from Figures 11, 12 and 13 likewise appearing upon Sheet 3.

So far as I am aware, the printing of any circuit upon any cylinder such as 137, either by direct application of "electrical circuit ink" or otherwise, is new. Hence it is within the ambit of this invention.

Another electrical device may be placed within the body of the cylinder 137. If this device generates radiant heat a reflective coating is placed upon the interior of the cylinder as previously described. Description of another preferred form of my invention having similar characteristics will be found in connection with Figure 22.

A construction alternative to that shown in Figure 16 is illustrated by Figure 20 (Sheet 5). A unit requiring protection from heat such as a thermopile 156 supported by mounting plates 158 and 160 corresponding to elements 16, 63 and 64 previously described in connection with Figure 16 are positioned within a chamber 162 which forms the upper portion of an envelope 164 which has been exhausted through an opening sealed at 166. Mounting posts 168 support the thermopile and house a portion of leads 170 and 172 which connect it with the remainder of the device. These pillars pass through a chamber 174 which has been evacuated at 176. Below a lower wall 178 of this housing I dispose a sheet of mica 180 upon the under portion of which a reflective surface 182 has been deposited. Pillars 168 pass through an oversized opening in this reflective and insulating sheet. A third and lower chamber 184 likewise has been exhausted and sealed and in effect houses an other electronic component, which may be the first stage of an amplifier. Lead 117 is shown as biased at 186. A grid 188 is activated by lead 170 from the thermopile and is associated with filament 190. The electrical arrangements and the method of operation of this variant is generally the same as that described in connection with Figure 16.

A construction alternative to that described in connection with Figures 17 and 18 is shown in Figure 21 with a reference to Figure 22. Upon the exterior of a cylindrical envelope 192 an electrical device generally indicated as 193 is formed in the manner described or illustrated hereinbefore in connection with Figures 17 and 18. This tube may be of glass, plastic or other suitable material. As shown it is a thermopile having hot junctions 194 and cold junctions 196. The entire instrument is placed within the housing 198 having a window 200 opposite which the hot junctions 194 are placed. Cold junctions 196 are within the housing and hence protected from ambient heat.

Another electronic device 202, in this instance illustrated as a transistor, is placed within the envelope. Since it does not generate heat it is not necessary that the inside of tube 192 be insulated.

A wiring diagram of Figure 22 is applicable to the structure of Figure 21 and also to that of Figures 23, 24 and 25 which are about to be described. As shown, transistor 202 is in circuit both with an electronic device 193, in this instance a thermopile and a controlled instrument 204 which may be a galvanometer with an indicating hand similar to that shown in Figure 9 and described in connection with reference characters 71—75.

An electrical device illustrated as but not limited to a thermopile can also well be constructed according to the methods of this application or otherwise as shown in Figures 23, 24 and 25. I use as a base a flat flexible sheet which after a circuit is printed thereon, either by the methods hereof or otherwise, I then roll into hollow cylindrical form. Whatever the circuit may be I prefer to form it as described herein and in my parent patent but I am not limited to such means and methods. Any type of circuit may be employed provided it is advantageously mounted upon a cylindrical surface. I illustrate this phase of my invention by a device as upon the interior of a cylinder, which is necessary with a thermopile portions of which must be protected from impinging rays, but other circuits may be applied to the exterior thereof.

As is best shown in Figure 23 a sheet 210 of any suitable flexible material, as for example a plastic, in this illustration necessarily dielectric, and preferably white and necessarily opaque to the radiation to which the instrument is responsive except for a narrow window 212 which must be transparent to that radiation, carries the desired thermopile. I show this thermopile as double. It consists of alternate filaments of silver 214 and bismuth 216 formed in V-shaped couples comprising hot junctions 218 and cold junctions 220, the two components of the device being connected by a filament 222. As previously stated I prefer to form this thermopile by the methods and means shown and claimed by my parent patent and herein but my invention is not so limited.

After the circuit, whatever it may be, is applied the flat flexible sheet is rolled into a cylinder and the two ends are joined either by heat or by an adhesive. The finished mechanism as shown in Figures 24 and 25 consists of the sheet 210 rolled into a cylinder with the window 212, a base 224 and a cap 226. Appropriate leads, shown as three, are carried through the base. It is often convenient to introduce within the tube thus formed another electrical instrument, as for example a transistor 202, previously described. The wiring diagram of Figure 22 is applicable to the form of my invention shown in Figures 23, 24 and 25, assuming that a transistor or other instrument requiring a similar circuit is inserted within the cylinder. Since a transistor does not generate heat, no need for insulation arises. If separation on account of temperature is required, this cylindrical form, made from a flat sheet is advantageous. One circuit can be printed on each side and a third component placed within the hollow cylinder. In this way space and complication are saved, and three circuits may easily be mounted in and on the one envelope.

As previously stated any electrical circuit within reason may be imprinted according to the methods of this invention. As is shown in Figures 26–33, which make up Sheet 6, these circuits may include a resistance element for a condenser. In a relatively simple form the following steps are applied:

(1) Application to a suitable base of a resist with a pattern representing a conducting circuit;
(2) Disposition of the metal for such circuit;
(3) The removal of the resist with the unwanted metal thereupon;
(4) The imprinting of a circuit with a pattern representing a resistance element;
(5) Deposition of metals making up the circuit;
(6) The removal of the resist.

Figure 26 shows a desired circuit characterized by conductors generally indicated as 230 and 232 terminating respectively in relatively small contact disks 234 and 236 respectively joined by a resistance 236 with a condenser 238 in circuit. To secure such a device the steps illustrated by Figures 27-30 and indicated above are taken.

In view of the previous illustration of my method and means as applied to a thermopile there is no need to repeat the previous illustration and description. Stamps similar to those of Figures 1-8, both inclusive, for cylindrical printing devices such as those of Figures 11, 12 and 13 may be employed but formed into patterns which are appropriate for the application of the two-stage electrical devices with which I illustrate this phase of my invention.

Figure 27 represents base plate 228 after the first stage of filament deposition representing components of the conducting circuit. This stage of course follows the making of a printing plate, cylindrical or flat, which has upon it raised portions representing the leads 230 and 232 and the contact disks 234 nad 236. These disks are important as providing easy attachment for other leads. Thereafter such a printing plate is "inked" by a resist and applied to the base 28. I show these bases as separate, as of course they are when used, but I much prefer to make them in long strips, such as is indicated in Figure 19, and then to cut apart the individual units. This plate of course resembles the structure of Figure 27, the lines upon the base corresponding to protuberances which prevent the adherence of the resist to that portion of the base. After the base is so coated with a resist metal is deposited thereupon. After it is cleaned the filaments 230 and 232 as shown in Figure 27 appear. The next printing operation is to add a resistance element 236 across the leads. To do this a printing plate such as 240, if flat and correspondingly formed if cylindrical, is provided with a raised portion 242. After this flat or cylindrical plate has been "inked" with a resist it is applied to the base of Figure 27. All of that base except the space which is to be occupied by resistance 236 thereupon is covered by the resist. After the deposition operation the base takes the appearance of Figure 29 with a resistance 236 across the leads. This resistance in Figures 29 and 30 is shown actually and not symbolically for easier comparison with Figure 28. A separate condenser 238 added to the base completes the device as is shown in Figure 30.

A construction alternative to those of Figures 26-30, which is shown in Figures 31, 32 and 33, provides for the imprinting of a condenser in accordance with the methods and mechanisms hereof. As is indicated schematically in Figure 31 one leg 250 of a conductive circuit is printed upon a base 252 together with a condenser disk 254. The process and mechanism which result in this intermediate structure will be understood from the previous description. After the resist has been removed the disk is covered with a lacquer of a non-soluble type or if desired with a ceramic glaze which will have to be fired on. Such non-soluble lacquers are well-known and discussed later in connection with Figure 34. The result is as shown in Figure 32.

The device is completed by adding a resist of the type described in the first part of this application and the depositing on the pattern thus formed of a conductor representing a second leg 261 of the conductive circuit and a second condenser disk printed over the first condenser disk, thus completing the condenser 260. Thereafter a resistive element such as 236 may be imprinted across the leads 250 and 261 as previously described.

Again I emphasize that in all of these operations I prefer to make use of the previously described principle of printing a plurality of individual units upon a long sheet and later cutting them apart. Also note is made of the fact that I may print according to the methods hereof upon both sides simultaneously.

Under many conditions it is desirable to "jump" a lead of one circuit over a lead of another. In general method and means such as those described hereinbefore are employed except for an additional printing step of applying a dielectric coating over a lead which is to be crossed by another without electrical contact.

As is shown in Figure 34, for such purposes I use a dielectric varnish which can be applied by a printing roller 81 and 91 hereof. Such varnishes, for example, may be Harvel 902 or Harvel 905. As stated in an earlier part of this application I may use resists which are water-soluble. These printing varnishes are not soluble in water. In those cases in which they are applied over a resist, as is unusual, that portion of the resist underneath the varnish does not cause the layer of dielectric varnish to be removed. As shown in the fragmentary sketch which is Figure 34 a lead 272 of one circuit is formed upon a base 270, preferably but not necessarily according to the methods and means hereinbefore described. Thereafter a thin dielectric coating 274 is applied by printing methods and still later a second circuit including a lead 275 is printed over the dielectric surface 274. It will be understood that the resist which must be placed above the dielectric surface 274 is of course removed by a solvent which does not affect the dielectric protective coating.

Included within this method is the printing by a single operation of both the dielectric varnish, for the purposes just described, upon one portion of a base, and an ordinary resist upon another. The dielectric varnish or a portion of it can carry a portion of the electrical pattern and thus take the place in part of the resist, when the removal of all of the varnish (as distinct from that serving a dielectric function) is not necessary.

For convenience in the sub-joined claims I use the words "metal" or "conductor" to indicate the effective portion of any one of my printed patterns, whether that portion be metal or a conducting non-metallic composition, or a resistance or indeed an insulating instrumentality which forms a working portion of the pattern.

The advantages of my invention will be made apparent from the foregoing portion of this specification, the attached drawings and the sub-joined claims. They include improved mechanism for printing sensitive and rugged thermopiles and improved methods and mechanisms for printing other dielectrical devices. Other advantages lie in improved mountings of thermopile units, a novel and effective combination of thermopiles and other electronic devices, and improved electronic devices of various types.

I claim:

1. A method of producing an electrical device having at least two components which comprises applying a resist to a raised surface which represents all of a pattern for a base for the device except that upon which a first of said components is to appear, depressed portions of said first surface representing the remainder of the pattern for said base upon which the first of said components is to appear, transferring said resist from said surface to an electrically non-conducting base except that upon which a first of said components is to appear, condensing upon said base so coated a vapor of a metal forming said first component, cleaning the resist and the metal deposited thereupon from the base thereby leaving said first component joined to the base, printing a dielectric varnish upon a portion of said first component where a part of said second component is to cross but not be electrically joined to said first component, applying a resist to another or second raised surface representing all of a pattern of the base except that portion upon which a second component is to appear, depressed portions of the second surface representing the remainder of the pattern for said base upon which the second of said components is to appear, transferring said resist on the second surface to said base, raised portions being so disposed that when applied to said base they form a cross-over over said first component at the location of said applied dielectric varnish, depositing upon said base the vapor of metal to form the second component, and cleaning from said base and said first component said second resist thereby leaving on said base a desired pattern of both of said components.

2. A method of producing an electric device including conductors, a resistance and a condenser which comprises applying a resist to a raised surface which represents all of a pattern for a base for the device except those portions upon which a portion of said conductors and a first element of said condenser are to appear, depressed portions of said first surface representing the remainder of the pattern for said base upon which a portion of said conductors and first element of said condenser are to appear, transferring said resist from said surface to an electrically non-conducting base except that upon which said portion of the conductors and said condenser are to appear, condensing upon said base so coated a vapor of a metal forming said conductors and said first condenser element, cleaning the resist and the metal deposited thereupon from the base thereby leaving said portion of said conductors and first condenser element joined to the base, covering said first element of the condenser with a non-soluble lacquer, applying a resist to a second raised surface representing all of a pattern of a base except those portions upon which the remainder of said conductors and a second element of said condenser are to appear, depressed portions of said second surface representing the remainder of said pattern for said base upon which the remainder of said conductors and said second element of the condenser are to appear, transferring the resist on said second raised surface to said base, raised portions being so disposed that when applied to said base they cover all except said remainder conductor portions and said second element of the condenser, depositing upon said base the vapor of metal to form the remainder of the conductors and said second element of the condenser, applying a resist to a third raised surface representing all of a pattern of a base except that upon which a resistance is to appear connected to certain of said deposited conductors, depressed portions of said third surface representing the remainder of said pattern for said base upon which the resistance is to appear, transferring the resist on the third raised surface to said base, raised portions being so disposed that when applied to said base they cover all except said resistance portion, depositing a resistance-type metal upon said base to form said resistance, and cleaning from said base said resist and the resistance-type metal thereupon.

References Cited in the file of this patent

UNITED STATES PATENTS

| | | | |
|---|---|---|---|
| 398,995 | Atterbury | Mar. 5, | 1889 |
| 1,207,972 | Miksch | Dec. 12, | 1916 |
| 1,303,404 | Simon | May 13, | 1919 |
| 1,638,943 | Little | Aug. 16, | 1927 |
| 1,667,142 | Darrah | Apr. 24, | 1928 |
| 1,809,475 | Dowler | June 9, | 1931 |
| 1,884,068 | Mendel | Oct. 25, | 1932 |
| 2,139,640 | Mall et al. | Dec. 6, | 1938 |
| 2,345,989 | Ormond | Apr. 4, | 1944 |
| 2,381,819 | Graves et al. | Aug. 7, | 1945 |
| 2,386,731 | Wenzelberger | Oct. 9, | 1945 |
| 2,474,988 | Sargrove | July 5, | 1949 |
| 2,559,389 | Beeber et al. | July 3, | 1951 |
| 2,602,731 | Nierenberg | July 8, | 1952 |
| 2,629,757 | McKay | Feb. 24, | 1953 |

UNITED STATES PATENT OFFICE
CERTIFICATE OF CORRECTION

Patent No. 2,886,475                                                   May 12, 1959

Herbert Couchman McKay

It is hereby certified that error appears in the above numbered patent requiring correction and that the said Letters Patent should read as corrected below.

Column 1, in the heading to the printed specification, ninth line thereof, for "to February 24, 1953 has been disclaimed" read -- to seventeen (17) years from February 24, 1953 has been disclaimed --; column 11, line 73, for "palte" read -- plate --; column 12, line 71, for "thermopile of" read -- thermopile or --; column 14, line 31, for "formed in" read -- formed into --; column 15, line 18, for "nad" read -- and --; column 17, line 4, for "electric" read -- electrical --.

Signed and sealed this 13th day of October 1959.

(SEAL)
Attest:

KARL H. AXLINE                                                                 ROBERT C. WATSON
Attesting Officer                                                     Commissioner of Patents